(12) United States Patent
Feuchter et al.

(10) Patent No.: US 8,831,912 B2
(45) Date of Patent: Sep. 9, 2014

(54) CHECKING OF FUNCTIONS OF A CONTROL SYSTEM HAVING COMPONENTS

(75) Inventors: Wilfried Feuchter, Kupferzell (DE); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 13/245,425

(22) Filed: Sep. 26, 2011

(65) Prior Publication Data
US 2012/0078575 A1     Mar. 29, 2012

(30) Foreign Application Priority Data
Sep. 27, 2010   (DE) .......................... 10 2010 041 437

(51) Int. Cl.
*G06F 19/00* (2011.01)
*G05B 9/03* (2006.01)
*G05B 23/02* (2006.01)

(52) U.S. Cl.
CPC .............. *G05B 23/0251* (2013.01); *G05B 9/03* (2013.01)
USPC ........................................................ 702/182

(58) Field of Classification Search
CPC . G06F 21/55; H04L 63/1425; H04L 63/1441; H04L 2463/141; H04L 63/1483
USPC .................................................. 702/182–185
See application file for complete search history.

(56) References Cited

U.S. PATENT DOCUMENTS

2007/0035627 A1*   2/2007   Cleary et al. .................. 348/159

FOREIGN PATENT DOCUMENTS

| DE | 100 30 329 | 1/2002 |
|---|---|---|
| WO | WO 2008/040526 | 4/2008 |

* cited by examiner

*Primary Examiner* — Edward Raymond
(74) *Attorney, Agent, or Firm* — Kenyon & Kenyon LLP

(57) ABSTRACT

A method for checking functions, to be checked, of a control system, the control system having components to be checked, in particular redundant components, and an evaluation unit which evaluates the operability of the components on the basis of status reports of the components, the method including a component-side check of the functions, to be checked, of the components to be checked, and a system-wide check of at least one, but not all, of the functions checked on the component side.

17 Claims, 2 Drawing Sheets

CHECKING OF FUNCTIONS OF A CONTROL SYSTEM HAVING COMPONENTS

FIELD OF THE INVENTION

The present invention relates to a method for checking functions of a control system having components, in particular redundant control devices, and to a corresponding control system.

BACKGROUND INFORMATION

Since faults in components of complex systems are not completely avoidable, systems which are critical with regard to safety must be set up to be tolerant of faults. Fault tolerance is the ability of a system to behave in a defined manner when a component breaks down or exhibits a fault, e.g., the ability to continue to provide correct, or at least no false, output quantities.

Applications that are critical with regard to safety use structures in which components are set up redundantly. So-called 1oo2 structures (1 out of 2) are based on the assumption that two redundant components behave identically, and that they supply identical output quantities for identical input quantities, as long as none of the components is faulty. In such structures a comparator thus performs continuous comparisons of the output quantities of the redundant components and stops the output if a discrepancy arises. While it is true that this so-called integrated, non-steady behavior causes a system standstill to come about in some instances, the further processing of incorrect output quantities is reliably prevented. The direct identification of the individual faulty component is usually impossible.

So-called 1oo2D structures additionally include a fault detection and the provision of status reports by the redundant components, which make it possible to detect the faulty component and to deactivate it selectively in the event of a discrepancy in the output quantities. This allows a continued (emergency) operation of the system using the intact component, at least for a certain period of time (integrated, steady behavior).

Also known are structures which provide such a deactivation based on status reports, but which do not necessarily perform a continuous comparison of the output quantities. In addition, it is known to hold one or more of the components in passive readiness and to activate the intact, passive component only if a fault has occurred in an active component, which then continues the operation accordingly.

In such systems a so-called voter supplies an evaluation or switchover signal on the basis of an evaluation of the status reports, which causes a corresponding system to switch from a faulty component to an intact component, that is to say, which activates it as the case may be, and which forwards input quantities to the component and makes output quantities of the component available at a system output. A corresponding voter checks the plausibility of the incoming status reports and makes a selection, for instance via a truth table. For example, the status reports include a plurality of activation recommendations associated with the particular components. A corresponding voter decision may be outvoted via a user intervention.

According to conventional safety standards (e.g., IEC 61508), components of a safety-critical system must be transferred into a safe state in the event of a fault. Paths via which this safe state is attained must regularly be checked also with regard to "latent" faults. This check, which is to be implemented at the start of an operating cycle, for instance, ensures that these paths are reliably available in the event of a fault. In the previously discussed redundant systems, e.g., in systems having two redundant control devices, the safe state is attained following a switchover to an intact control device via a voter, for instance, because a further operation is ensured via the intact control device in this case.

As mentioned, all paths that lead to a corresponding switchover are thus to be checked, usually once during the operating cycle, such as during the initialization of a system. A complete test of all paths, however, is time-intensive and complex from the software standpoint, since both components must be synchronized with respect to each other prior to such tests. Furthermore, given a plurality of paths, a switch between both control devices takes place several times, which causes excessive loading of corresponding components, which in turn increases the susceptibility to faults.

Therefore, improved options for checking functions of corresponding control systems are required, which are able to be implemented in a simple and reliable manner and which do not have the mentioned disadvantages.

SUMMARY OF THE INVENTION

In the approach according to the present invention, corresponding checks are not to be implemented for all functions or paths across the entire signal path and across all redundant components (e.g., two control devices); instead, this system-wide check is performed for only a portion of the functions (i.e., at least one function, but not all). The present invention utilizes the fact that functions to be checked in redundant control devices are able to be subdivided into component-side portions and non-component-side portions. The non-component-side portions of the functions are defined via common signal paths. That is to say, while the component-side portions of the functions are to be checked in function-specific manner, the remaining, i.e., non-component-side portions, are able to be checked jointly for a plurality of functions.

In the redundant components, output quantities are typically made available on the basis of input quantities, and a status report is supplied by the components. This component-side portion of the functions of a corresponding system runs completely within the particular components and thus is able to be checked completely on the component side if suitable control signals are available. According to the present invention, the status reports of the individual components are read back as control signals.

In a first step, the functions are therefore checked on the component side. The checking on the component side takes place by providing test signals as input quantities and reading back the individual status reports in at least one component. In an advantageous manner, a check of all functions of all components takes place.

In a next step, a complete check of a selected portion of the functions previously checked on the side of the components takes place at the system level. The check includes checking an evaluation of the status reports by an evaluation unit, e.g., a voter, and/or checking the provision of a corresponding (correct) evaluation signal by the evaluation unit. Test signals are once again made available as input quantities for this purpose, but the evaluation signal is read back for checking purposes. The evaluation signal may be read back either directly, or a switchover of a switch unit induced by an evaluation signal may be determined.

As mentioned, a system-wide check of all functions of a corresponding redundant system usually takes place when starting the system, that is to say, a check which includes switchover processes between the redundant components, which normally are implemented with the aid of relay switches. In contrast, one particular advantage of the measures provided according to the present invention is that the component-side check of the functions is able to run more rapidly and thus within the initialization phase of a corresponding system, because a (slow) switching of the relay switches is able to be avoided for a large portion of the checks, i.e., the portions on the component side. In an advantageous manner, a switchover of a corresponding relay switch during the initialization phase is prevented for this purpose, by overriding a voter decision, for instance.

Since relay switches are usually configured only for a limited number of switching cycles and age with each switching operation, especially when exposed to high loading, i.e., at high currents to be switched, the measures according to the present invention make it possible to achieve a significant service life extension.

In addition, the present invention allows a simplified coordination in corresponding tests. The perfect interaction between the components, which requires a synchronization, for instance, has to be ensured for only a portion of the checks, i.e., the system-wide checks. In other words, the tests within the control device are able to be carried out during initialization, without any coordination difficulties.

For example, a check of an overvoltage and undervoltage monitor of a corresponding system is able to be performed by simulating a voltage fault while supplying corresponding input quantities, and by checking the effects in an output stage. If it is switched off, the test was successful and the path leading up to the output stage is safeguarded with regard to latent faults. During the initialization, a switchover between components is generally prevented, so that even the mentioned test does not lead to a switchover.

A system-wide check, including a switchover between the components, is performed during a self-test, for instance, e.g., in avionics applications during a test protocol required of a pilot and described in the manual. For such a purpose both control devices must coordinate or synchronize themselves with each other with regard to the subsequent tests. Once the coordination has occurred, a switchover path of a monitoring module is activated, for example, and both control devices check whether a switchover—i.e., a switch setting induced by an evaluation signal—has taken place within a specific period of time. Then, e.g., after a fault in one of the components has been reset, the reverse switchover is checked in the same manner. If both checks are successful, this constitutes proof that the non-component-side portion of the functions leading up to a decision module, e.g., a voter, and thus the complete signal path, is free of latent faults as well.

DETAILED DESCRIPTION

Figure 1:
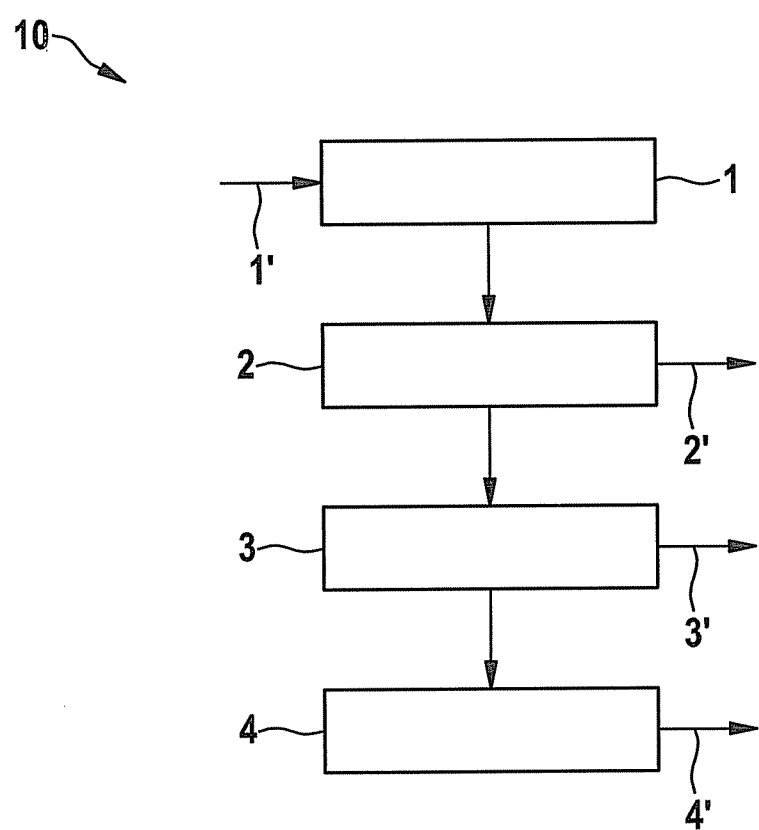
FIG. 1 shows the sequence of a method according to a preferred embodiment of the present invention, in the form of a flow chart.

FIG. 1 shows the sequence of a method 10 according to an especially preferred embodiment of the present invention in the form of a flow chart.

Method 10 begins with a first step 1, in which a corresponding system receives a check request 1', which triggers a corresponding check. Step 1 may also be a system initialization step which, by itself, triggers a check without requiring a check request 1'.

In a step 2, functions of the system are checked on the side of the components, i.e., in control devices or sub-control devices of a system. To do so, test signals are provided as input quantities and the individual status reports of the components are read back. If a fault is detected in this step, a corresponding fault report 2' will be output.

Has the component-side check in step 2 been carried out successfully, a system-wide check of at least one function takes place in a step 3, preferably a check of at least one function or of one of the functions checked in step 2. Test signals are provided as input quantities and the individual evaluation signal is read back in an individual component performing the check. If a fault is detected in this step, a corresponding fault report 3' is output.

If the component-side check in step 3 has been carried out successfully as well, the entire check routine has been run through successfully, and the system is in an operative state in step 4. This may be indicated by the output of a report 4'.

Figure 2:
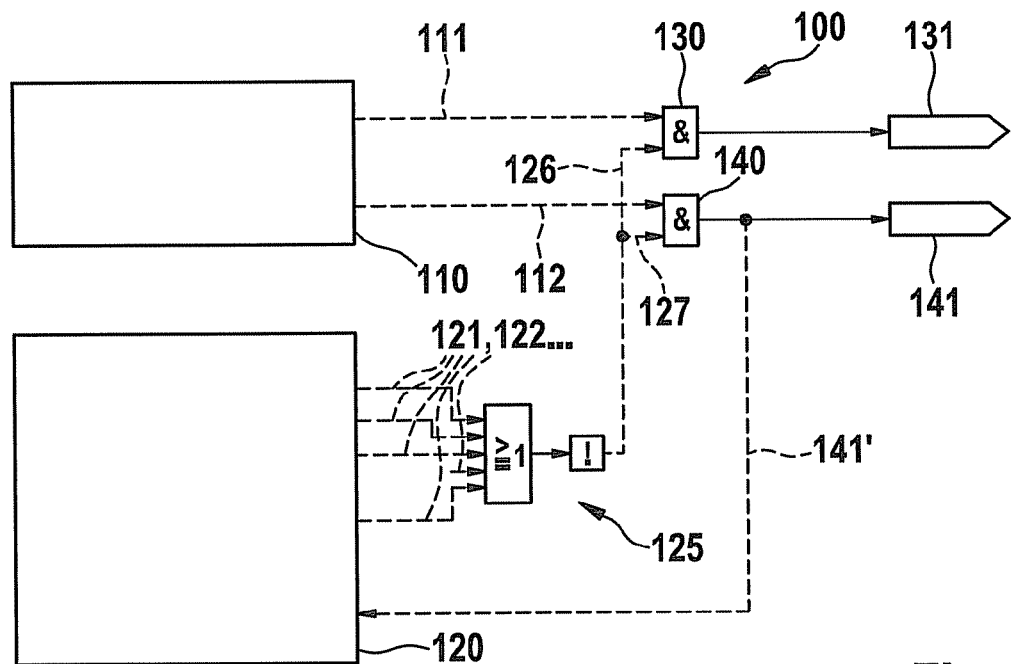
FIG. 2 shows a component-side check of functions according to a preferred embodiment of the present invention, in a schematic representation.

FIG. 2 schematically shows a component-side check of functions according to one especially preferred development of the present invention within a component 100. Two status reports 131, 141, which are identical as long as no fault function is present, are output as the result of the check. The two status reports usually correspond to two activation recommendations—one for each control device. Thus, status report 131, for instance, indicates that a first control device is able to be activated, and status report 141 indicates that a second control device is able to be activated.

Component 100, such as a control device or a subcontrol device of a redundant control device system, is equipped with a status signal module 110, among other components, which is set up to provide status signals 111, 112. Status signals 111, 112, together with monitoring reports 126, 127, are forwarded to two status-signal processing units 130, 140 which are implemented as logic units ("AND") in redundant fashion. Each status-signal processing unit 130, 140 outputs a status report 131, 141, which indicates a fault-free operation if a signal ("1") is applied at both inputs. Status signals 111, 112 are activation recommendations generated by a first level within the control device. This frequently is a software level or a functional level, and the operativeness of the first and the second control device is checked in the conventional manner. In such a level-1 check at the functional level, the absence of faults in hardware components is typically impossible to check by itself, so that a second level is provided as monitoring level.

Status reports 131, 141 are generated by the second level within the control device and output as long as no fault has been determined in the component-side check. For this purpose, status reports 131, 141 are formed from monitoring signals 121, 122, . . . of a monitoring module 120 by means of a logic unit 125, which outputs a signal ("1") precisely when no signal ("1") is applied at any of the inputs, i.e., when no fault is indicated. The level-2 check is typically also suitable for checking the absence of faults in hardware components. By linking (130, 140) the level-1 signals (111, 112) and the level-2 signals (126, 127), it is therefore possible to "outvote" the level-1 signal when detecting a level-2 fault. Status report 141 is read back via channel 141' within the framework of a check by monitoring module 120 in order to be able to check whether desired outvoting has actually taken place.

By providing corresponding system inputs, which also include a fault simulation, for example, it is therefore possible to check the correct triggering of a status report 141, thereby enabling a component-side check. Although not illustrated, it is also possible to provide for read-back of status report 131.

Figure 3:
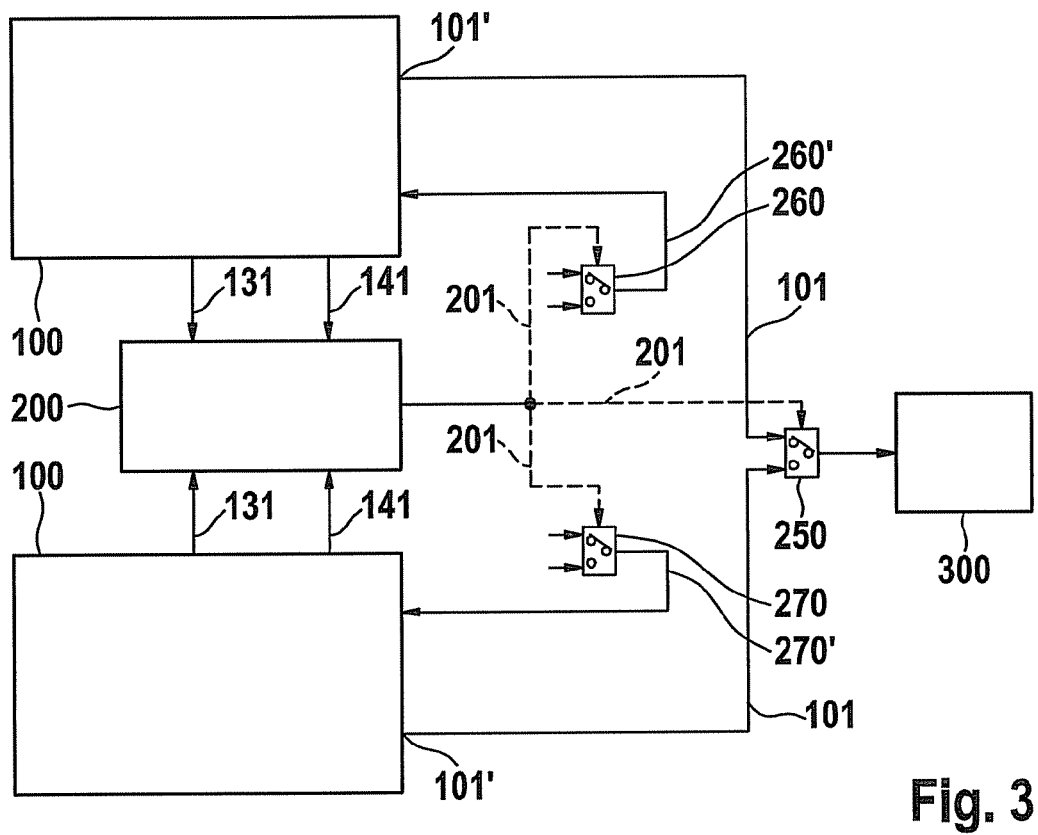
FIG. 3 shows a system-wide check of functions according to a preferred embodiment of the present invention, in a schematic representation.

FIG. 3 schematically illustrates a system-wide check of functions according to an especially preferred specific development of the present invention, with the aid of two components 100 and an evaluation unit 200. In the illustrated example, these are two components 100 according to FIG. 2.

Both components 100 are designed to provide status reports 131, 141 (activation recommendations), which are able to be generated within the scope of FIG. 2. Status reports 131, 141 are forwarded to evaluation unit 200. On the basis of the activation recommendations of status reports 131, 141, evaluation unit 200 induces a switchover of a switch 250, e.g., a relay switch, by means of an evaluation signal 201 supplied by evaluation unit 200.

The switchover of switch 250 brings about a selective connection of a signal receiver 300, e.g., a corresponding actuator, to outputs 101' of one of the two redundant components 100, e.g., the control device, and thus the provision of corresponding output quantities 101. In the event of a fault in one of the two redundant components 100, this makes it possible to connect the remaining, intact component to signal receiver 300 in selective manner.

In addition, switches 260, 270 are provided, which in the event of a system-wide check are able to be switched in the same manner as switch 250, so that it is possible to indicate a switchover of corresponding switches 250 by switches 260, 270 in response to an evaluation signal 201. The switch position of test switches 260, 270 may be read back within the framework of the check via channels 260', 270'.

What is claimed is:

1. A method for checking functions of a control system, the control system including components to be checked, and an evaluation unit, which evaluates an operability of the components on the basis of status reports of the components, the method comprising:
    component-side checking of the functions of the components;
    outputting, by each of the components, an individual status report as a result of the component-side checking if the component does not detect a fault during the checking;
    system-wide checking, by the evaluation unit, of at least one, but not all, of the functions checked by the component-side checking, based on an evaluation of at least one of the individual status reports; and
    outputting an evaluation signal as a result of the system-wide checking.

2. The method according to claim 1, wherein at least one component is redundant of at least one other components.

3. The method according to claim 1, wherein the system-wide checking includes checking one of the functions checked on the component side.

4. The method according to claim 1, wherein the check on the component side commences at an initialization of the control system.

5. The method according to claim 1, wherein the check on the component side includes a disabling of a switchover between the components, wherein the disabling of the switchover is induced by the evaluation unit.

6. The method according to claim 1, wherein the check on the component side includes a read-back of the status report within the components.

7. The method according to claim 1, wherein the check on the component side includes a simulation of fault states of the functions.

8. The method according to claim 1, wherein the components are synchronized with each other during the system-wide checking.

9. The method according to claim 1, wherein the system-wide checking is performed during a check protocol.

10. The method according to claim 1, wherein at least one of the components is redundant of at least another one of the components, and the method further comprises:
    inducing a switchover of a switch using the evaluation signal, the switch selectively coupling an output of only one of the redundant components to a signal receiver.

11. The method according to claim 1, further comprising:
    outputting a fault report if the component detects a fault during the component-side checking.

12. The method according to claim 1, wherein at least one of the components is redundant of at least another one of the components, and wherein the system-wide checking includes selectively connecting each of the redundant components to a signal receiver and checking output quantities.

13. The method according to claim 12, wherein if a fault is detected in one of the redundant components during the system-wide checking, then during the inducing, the switch selectively couples the output of the other one of the redundant components to the signal receiver.

14. A control system comprising:
    components to be checked, each of the components configured to output an individual status report if, after a component-side checking of functions of the component, the component does not detect a fault; and
    an evaluation unit configured to:
    evaluate the operability of the components based on at least one received individual status report,
    perform, based on the evaluation, a system-wide checking of at least one, but not all, of the functions checked by the component-side checking, and
    output an evaluation signal as a result of the system-wide checking.

15. The control system according to claim 14, wherein at least one component is redundant of at least one other component.

16. The control system according to claim 14, wherein the components are control devices, redundantly implemented, for actuating actuators.

17. The control system according to claim 14, wherein at least one of the components is redundant of at least another one of the components, and wherein the system further comprises:
    a switch configured to selectively couple an output of only one of the redundant components to the signal receiver using the evaluation signal.

* * * * *